United States Patent [19]
Apelian et al.

[11] Patent Number: 5,393,717
[45] Date of Patent: Feb. 28, 1995

[54] REGENERATION OF NOBLE METAL CONTAINING ZEOLITE CATALYSTS VIA PARTIAL REMOVAL OF CARBONACEOUS DEPOSITS

[75] Inventors: Minas R. Apelian, Vincentown, N.J.; Anthony S. Fung, Wilmington, Del.; George H. Hatzikos, Mantua, N.J.; Clinton R. Kennedy, West Chester, Pa.; Chung-Hur Lee, Taipei, Taiwan, Prov. of China; Thomas R. Kiliany, West Chester, Pa.; Poh K. Ng, Singapore, Singapore; David A. Pappal, Haddonfield, N.J.

[73] Assignee: Mobil Oil Corp., Fairfax, Va.

[21] Appl. No.: 63,203

[22] Filed: May 18, 1993

[51] Int. Cl.⁶ .................... B01J 29/38; B01J 38/14; C10G 35/95; C10G 47/18
[52] U.S. Cl. .................... 502/52; 208/111; 208/140; 502/38; 502/50
[58] Field of Search .......... 502/52, 50, 38, 62; 208/111, 140

[56] References Cited

U.S. PATENT DOCUMENTS

| | | | |
|---|---|---|---|
| 3,424,671 | 1/1969 | Kay | 208/111 |
| 3,525,775 | 8/1970 | Bolton et al. | 260/668 |
| 3,556,985 | 1/1971 | McCoy | 208/140 |
| 3,651,160 | 3/1972 | Reuss et al. | 260/669 |
| 4,001,346 | 1/1977 | Chu | 260/671 M |
| 4,428,819 | 1/1984 | Shu et al. | 208/46 |
| 4,541,919 | 9/1985 | La Pierre et al. | 208/111 |
| 4,554,065 | 11/1985 | Albinson et al. | 208/59 |
| 4,600,700 | 7/1986 | McHale | 502/50 |
| 4,612,108 | 9/1986 | Angevine et al. | 208/111 |
| 4,657,874 | 4/1987 | Borghard et al. | 502/35 |
| 4,849,385 | 7/1989 | Huang et al. | 502/35 |
| 5,155,075 | 10/1992 | Innes et al. | 502/52 |

*Primary Examiner*—Paul E. Konopka
*Attorney, Agent, or Firm*—Alexander J. McKillop; Dennis P. Santini; Edward F. Kenehan, Jr.

[57] ABSTRACT

There is provided a process for regenerating a coked catalyst comprising a zeolite and a noble metal such as platinum. The process involves treating the coked catalyst under somewhat mild oxidation conditions, whereby a sufficient portion of the coke is removed from the catalyst to restore the hydrocarbon sorption properties of the zeolite component to the level observed in the non-coked form. Surprisingly, the original activity of the catalyst is substantially restored, even though a substantial amount of coke remains on the regenerated catalyst.

25 Claims, 2 Drawing Sheets

REGENERATION OF NOBLE METAL CONTAINING ZEOLITE CATALYSTS VIA PARTIAL REMOVAL OF CARBONACEOUS DEPOSITS

BACKGROUND

This application relates to a process for regenerating a coked catalyst comprising a zeolite and a noble metal such as platinum. The process involves treating the coked catalyst under somewhat mild oxidation conditions, whereby a sufficient portion of the coke is removed from the catalyst to restore the hydrocarbon sorption properties of the zeolite component to the level observed in the non-coked form. Surprisingly, the original activity of the catalyst, as measured in the non-coked form, is substantially restored, even though a substantial amount of coke remains on the regenerated catalyst. There is also provided herein means for monitoring the course of regenerations, as well as for mapping out conditions for subsequent regenerations.

An unwanted side reaction which often occurs in catalytic hydrocarbon conversions, especially those involving the use of catalytically active zeolites, is the formation of coke. Over time, this coke can become deposited on the zeolites in gradually increasing quantities until the activity of the catalyst is substantially reduced. When the activity of the catalyst is reduced by coke to an unsatisfactory level, it is customary to interrupt the hydrocarbon conversion process and to burn the coke off the catalyst under oxidation conditions sufficient to rapidly remove substantially all of the coke from the catalyst.

When substantially all of the coke is burned off a catalyst comprising a noble metal in combination with a zeolite, the noble metal is typically found to be in an agglomerated form. In order to fully regenerate such a catalyst, it is often necessary to subject the catalyst to further treatment, whereby the noble metal is redispersed in finely divided form to achieve maximum surface area of the noble metal on the catalyst.

Processes for redispersing noble metal on zeolite catalysts are described in U.S. Pat. Nos. 4,657,874 and 4,849,385, the entire disclosures of which are expressly incorporated herein by reference.

SUMMARY

In accordance with inventive subject matter described herein, it has been discovered that a coked catalyst comprising a zeolite and noble metal can be successfully regenerated, provided that the regeneration conditions are controlled, whereby less than all of the coke is removed from the catalyst. However, control of these regeneration conditions is difficult. In accordance with further inventive subject matter described herein, means for controlling these regeneration conditions have also been discovered. These control means involve means for planning or mapping out the regeneration conditions, as well as means for monitoring the course of the regeneration.

In accordance with one aspect of inventive subject matter described herein, there is provided a process for regenerating a catalyst, while at the same time providing a means for mapping out the conditions for subsequent regenerations. More particularly, there is provided a process for regenerating a catalyst which has been deactivated by coke deposition thereon, said catalyst comprising a zeolite and a noble metal, said process also providing a means for selecting oxidation conditions for subsequent regenerations, said process comprising the steps of:

(a) contacting said catalyst with an oxygen containing gas under sufficient oxidation conditions to progessively remove said coke from said catalyst in a controlled manner;

(b) removing samples of said catalyst during the course of the progressive removal of coke achieved in accordance with step (a);

(c) measuring at least one of the following properties for each sample removed in accordance with step (b): (1) the sorption rate of a probe molecule into said sample; or (2) the amount of noble metal agglomeration in the sample;

(d) determining at least one of the following aspects of the process: (1) the point during course of progressive removal of coke in step (a) when the maximum sorption rate of said probe molecule is reached for samples measured as per step (c); or (2) the point during course of progressive removal of coke in step (a) when the rate of noble metal agglomeration increases significantly for samples measured in step (c);

(e) discontinuing the oxidation conditions of step (a); and (f) recovering said catalyst having coke removed therefrom.

In accordance with another aspect of inventive subject matter described herein, there is provided a process for regenerating a catalyst using previously mapped out regeneration conditions. More particularly, there is provided a process for regenerating a catalyst which has been deactivated by coke deposition thereon, said catalyst comprising a zeolite and a noble metal, said process comprising the steps of:

(i) contacting said catalyst with an oxygen containing gas under conditions sufficient to progressively and only partially remove coke from said catalyst;

(ii) discontinuing said oxidation conditions of step (i) at a point when the catalyst contains at least 1 weight percent of coke, as measured by elemental analysis of carbon, based upon the weight of fresh catalyst; and (iii) recovering said catalyst containing at least 1 percent by weight of coke, wherein said oxidation conditions employed in step (i) and said point which these conditions are discontinued as per step (ii) are determined by monitoring a test regeneration of a batch of said catalyst, said monitoring comprising the steps of:

(a) contacting a batch of said catalyst with an oxygen containing gas under sufficient oxidation conditions to progessively remove said coke from said catalyst in a controlled manner;

(b) removing samples of said catalyst during the course of the progressive removal of coke achieved in accordance with step (a);

(c) measuring at least one of the following properties for each sample removed in accordance with step (b): (1) the sorption rate of a probe molecule into said sample; or (2) the amount of noble metal agglomeration in the sample;

(d) determining at least one of the following aspects of the test process: (1) the point during course of progressive removal of coke in step (a) when the maximum sorption rate of said probe molecule is reached for samples measured as per step (c); or (2) the point during course of progressive removal of coke in step (a) when the rate of noble metal agglomeration increases significantly for samples measured in step (c); and (e) using the determinations of step (d) to set the conditions of step (i) and the point at which these conditions are discontinued as per step (ii).

In accordance with another aspect of inventive subject matter described herein, there is provided a process for regenerating a catalyst while monitoring the course of the regeneration. More particularly, there is provided a process for regenerating a catalyst which has been deactivated by coke deposition thereon, said catalyst comprising a zeolite and a noble metal, said process comprising the steps of:

(i) contacting said catalyst with an oxygen containing gas under conditions sufficient to progressively and only partially remove coke from said catalyst;

(ii) removing at least one sample of catalyst during the course of step (i) and, for each sample removed, measuring either (1) the rate of sorption of a probe molecule or (2) the noble metal agglomeration;

(iii) using the measurement(s) taken in step (ii) to determine whether to modify or discontinue the oxidation conditions of step (i);

(iv) discontinuing said oxidation conditions of step (i) at a point when the catalyst contains at least 1 weight percent of coke, as measured by elemental analysis of carbon, based upon the weight of fresh catalyst; and (v) recovering said catalyst containing at least 1 percent by weight of coke.

EMBODIMENTS

Figure 1:
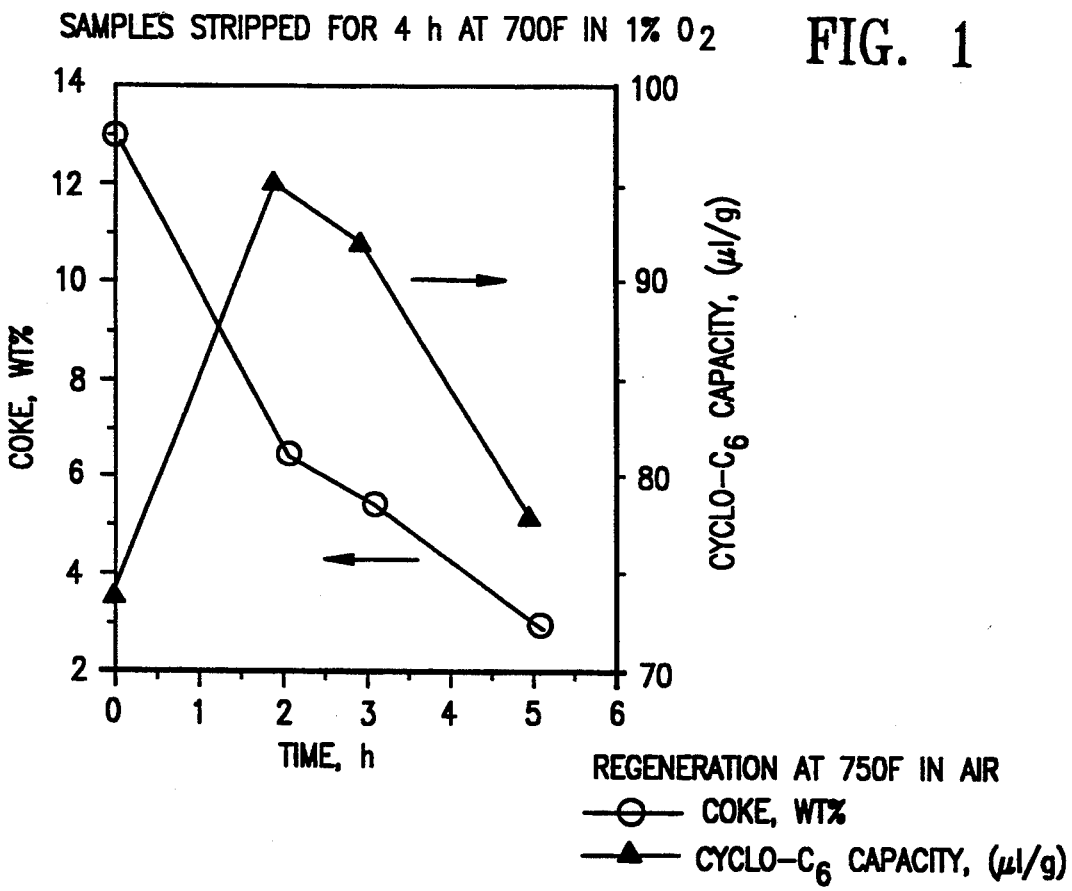
FIG. 1 is a graph showing coke loading and cyclohexane sorption capacity as a function of time for a catalyst subjected to regeneration conditions.

Catalysts comprising a zeolite and a noble metal may be used in a variety of hydrocarbon conversion processes, especially those requiring a catalyst having dual functionality for acid catalysis and hydrogenation/dehydrogenation promotion. Examples of such processes include hydrocracking, naphtha reforming and dewaxing. Examples of such dewaxing processes include hydrocracking dewaxing and hydroisomerization dewaxing. Such dewaxing processes are described in U.S. Pat. Nos. 4,428,819; 4,554,065; and 4,612,108, the entire disclosures of which are expressly incorporated herein by reference.

The present invention is useful in reactivating noble metal-containing zeolite catalysts which have become deactivated during a hydrocarbon processing step. When it becomes apparent that a catalyst has become deactivated, the hydrocarbon processing step is stopped by terminating the flow of hydrocarbon feedstock. It is preferred that the reactor be purged of hydrocarbons by feeding a hydrogen stream therethrough. It is contemplated that temperatures of from about 200° to about 500° C. and pressures ranging from atmospheric to the operating pressure of the process may be used in the hydrogen purge.

The reactor can also be purged subsequently with an inert gas in order to remove the hydrogen. Suitable purge conditions include temperatures of from about 200° to about 500° C. and pressures of about 1 to 40 atm, using a stream of inert gas such as nitrogen.

A procedure is disclosed herein for regenerating noble metal containing zeolite catalysts based on partial removal of carbonaceous deposits. The procedure is applicable to both in-situ and ex-situ type regenerations. The procedure may use an oxygen-containing gas, e.g., containing 1-21 vol % $O_2$, at elevated temperatures. The oxygen containing gas may contain nitrogen and, optionally, combustion products, such as $CO_2$, CO, $H_2O$, $SO_2$, $SO_3$, $SO_4$, $NO_2$ and NO. The oxidation temperature may be, e.g., from about 350° F. (177° C.) to about 1200° F. (649° C). The exposure time can vary depending on $O_2$ concentration, oxidation temperature and initial catalyst coke loading. For example, when the oxidation temperature is below 800° F. (427° C.), the exposure time to oxygen-containing gas may be, e.g., from 2 to 150 hours. The deactivated catalyst may contain at least 5 wt. %, e.g., at least 15 wt. %, e.g., from about 30 wt. % to about 50 wt. %, coke, as measured by elemental analysis of carbon, based upon the weight of the fresh catalyst. Regenerated catalysts can contain at least 1 wt %, e.g., 3-15 wt %, e.g., 3-8 wt. %, coke as measured by elemental analysis of carbon, based on fresh catalyst weight.

Catalyst regeneration should take place under conditions sufficient to assure uniform temperature control and uniform coke removal. For example, the catalyst may be loaded onto a regenerator belt where it is spread out in a uniformly thin layer, approximately 0.5 to 0.75 inches in depth across the width of the belt. The catalyst then moves with the belt through a heating zone in which the catalyst bed depth, the temperature of the zone, and the amount of oxygen are controlled.

After coke is removed from the catalyst, this catalyst may be subjected to reducing conditions to reduce platinum. The reducing procedure which follows removal of the coke from the catalyst material utilizes any suitable reducing agent, preferably hydrogen. Reduction of the catalyst material may be achieved by contacting it with the reducing agent under suitable reducing conditions. These may include temperatures ranging from about 100°–550° F. (38°–288° C.), preferably about 200°–400° F. (93°–232° C.), and contact times ranging from about 30 minutes to 10 hours, preferably about 1 to 3 hours. Where the reducing agent is in the gaseous form, e.g., hydrogen, said reduction may be carried out at pressures ranging from about 0 to 2000 psig, preferably about 0 to 150 psig.

The process of the present invention has been found to be effective even in rejuvenating highly siliceous zeolites of silica-alumina ratios greater than about 30, 40 or even 100. Although it is contemplated that the present invention may be employed with any highly siliceous zeolite, it is believed to be particularly useful with zeolites selected from the group consisting of zeolite Y, zeolite beta, ZSM-3, ZSM-4, ZSM-5, ZSM-11, ZSM-12, ZSM-18, ZSM-20, ZSM-22, ZSM-23, ZSM-35, ZSM-38, ZSM-48, MCM-22, and MCM-49.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Patent No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-22 is described in U.S. Pat. No. 4,556,477, the entire contents of which is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,406,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

MCM-22 is described in U.S. Pat. No. 4,986,894.

MCM-49 is described in copending U.S. application Ser. No. 7/802,938, filed Dec. 6, 1991.

The catalyst treated by the process of the present invention contains at least one noble metal such as platinum, palladium, iridium, osmium, rhodium, and ruthenium. These noble metals are generally associated and supported on a zeolite catalyst. The process can also be used to regenerate multimetallic catalysts which contain one of the above noble metals and another metal selected from Groups IB, IVB, VIAA, or VII of the Periodic Table. The zeolite catalyst treated can be binder free or it can contain an inorganic oxide binder such as alumina, silica-alumina, magnesia, titania, zirconia, or thoria.

The discussion hereinafter provides descriptions of various measurements of catalysts which were made in Examples which follow.

Platinum Dispersion: X-ray Diffraction

The platinum (Pt) dispersion of the catalysts was characterized by X-ray diffraction (XRD). XRD measurement is a bulk technique and gives detectable diffraction lines when the Pt particle size is greater than 50 Angstroms. By comparing the area under a specific diffraction line to that of a reference sample with a known amount of XRD-visible Pt, the fraction of Pt particles greater than 50 Angstroms can be determined. The lower detectable limit on the amount of XRD-visible platinum is 0.1 wt. %.

Techniques for measuring XRD-visible platinum are discussed in a publication by Rohrbaugh, W. J. and Wu, E. L. in "Characterization and Catalyst Development", ACS Symposium Series, vol. 411, p. 279–302 (1989).

The XRD data reported herein were collected with copper K $\alpha$ radiation on a Scintag XDS2000/DMS2000 diffractometer. The samples were ground to fine powder and were pressed into the sample holder with a microscope slide. Precautions were taken to avoid preferred orientation. The data were recorded by step-scanning at 0.05° 2 theta per step from 26° to 43° 2 theta, where theta is the Bragg angle, and a counting time of 40 s for each step. The area of the Pt (111) diffraction line at 39.76° 2 theta was obtained by the use of a profile fitting routine using the Pearson VII curve type. The amount of XRD-visible Pt was found by determining the ratio of the area of the unknown to that of a reference.

Hydrocarbon Sorption Properties of Zeolite

Dynamic hydrocarbon sorption experiments were used to determine the cyclohexane sorption capacity and uptake rate after regeneration. To probe the zeolite accessibility, a 150° C. calcination was performed on the aged, stripped, or regenerated catalyst to remove moisture and light hydrocarbons. The sample was then exposed to a cyclohexane-containing helium stream at 100° C. The rate of cyclohexane uptake was monitored. The equilibrated cyclohexane sorption capacity gives the accessible micropore volume. Dynamic hydrocarbon sorption is described in a publication by Wu, E. L., Landolt, G. R., and Chester, A. W. in "New Developments in Zeolite Sci and Technology", Ed. Murakami, Y.; Iijima, A; and Ward, J. W., *Studies in Surface Sci. and Catalysis*, vol. 28 (1986).

The choice of the probe molecule is preferably based on the effective pore opening of the zeolite used in the fresh catalyst. Typically, the probe molecule is organic in nature and its critical dimension is slightly less than the effective pore opening of the zeolite. If the size of the probe molecule is larger than the zeolite pore opening, the probe molecule will not sorb on the zeolite. If the size of the probe molecule is too small, the sorption property of the zeolite will be not be properly gauged.

$^{129}$Xe NMR Spectroscopy $^{129}$Xe NMR spectra were obtained on the Bruker AM-250 spectrometer at 69.16 MHz using a 10 $\mu$s pulse and a 0.5 s recycle delay. $^{129}$Xe chemical shifts are references with respect to Xe gas extrapolated to zero pressure at 0.0 ppm.

The samples were prepared for the $^{129}$Xe NMR experiments by pretreating a known amount (~0.5–1.0 g)

at 250° C. and ~10⁻⁴ torr for 10 hours to remove the water and light hydrocarbons. The degassed samples were then exposed to Xe gas at a series of pressures ranging from 25 to 800 torr and allowed to equilibrate for at least 10 minutes prior to recording the $^{129}$Xe NMR spectrum. The Xe uptake at each pressure was measured by the weight increase of the sample.

Pilot Unit Evaluations

Regenerated catalysts were evaluated in fixed-bed hydroprocessing pilot units to determine the effect of regeneration conditions on isomerization/dewaxing performance. The start-up of the pilot units used a standard gas phase sulfiding procedure. The pilot units were evaluated at between 300-600 psig inlet hydrogen pressure and at a H$_2$ circulation rate of between 1000-4000 SCF/BBL. The reaction temperature was adjusted during the course of the reaction from a starting temperature of about 300° F. (149° C) to an end-of-cycle temperature of about 750° F. (399° C.) in order to maintain the desired level of conversion. The feedstock had properties shown in Table 1. The performance of regenerated catalysts was compared with that of the aged catalyst before regeneration as well as fresh catalyst on the same feed.

TABLE 1

| Feedstock Properties | |
|---|---|
| API gravity | 32.4 |
| Hydrogen, wt. % | 14.21 |
| Pour Point, °F. | 95 |
| KV @ 100° C., cst | 4.92 |
| Paraffins, wt. % | 41.8 |
| Mono naphthenes, wt. % | 15.8 |
| Poly naphthenes, wt. % | 26.7 |
| Aromatics, wt.% | 15.7 |
| SIMDIS, wt. % | °F. |
| .5% off | 560 |
| 5% off | 660 |
| 10% off | 695 |
| 20% off | 737 |
| 30% off | 766 |
| 40% off | 789 |
| 50% off | 810 |
| 60% off | 830 |
| 70% off | 852 |
| 80% off | 879 |
| 90% off | 918 |
| 95% off | 949 |
| 99.5% off | 1023 |

EXAMPLE 1

A noble metal (Pt) containing zeolite (beta) catalyst was streamed for 420 days in a hydroisomerization process application. The process was operated from 600°-800° F. and 0.5-4.0 LHSV with a variety of hydrotreated vacuum gas oils. After 420 days of stream, the catalyst lost 22° F. in activity and suffered a deleterious shift in product selectivity.

The aged catalyst contained 35-40 wt. % coke, based on fresh catalyst weight. It was exposed to 750° F. and 5 vol % O$_2$ gas mixture for a period of 10 hours. At the end of this exposure, the catalyst contained 6-8 wt. % coke and had an average platinum particle size of 15 Angstroms. The partially coked catalyst was restreamed with the same hydrocarbon feed as before, and it was found that the regeneration was completely successful in restoring fresh catalyst activity and selectivity.

COMPARATIVE EXAMPLE A

When 6-8 wt. % coke containing catalyst was further exposed to the O$_2$ gas mixture at 750° F. for an additional 10 hours the average platinum particle size increased to >40 Angstroms. Reducing the catalyst coke level from 6-8 wt. % down to 2-3 wt. % will be deleterious to the catalyst activity and selectivity due to the additional loss of platinum metal surface area.

COMPARATIVE EXAMPLE B

A batch of the aforementioned fresh catalyst was streamed for 230 days processing hydrotreated gas oils. The catalyst was regenerated in-situ in 1 vol % O$_2$ in N$_2$ at 850° F. The regenerated catalyst contained <0.25% coke. The clean-burned catalyst was restreamed and shown to be 10° F. less active than it was prior to regeneration. A second regeneration performed under milder conditions caused no further catalyst damage. This experiment indicates that high severity conditions necessary for complete carbon removal are injurious to catalyst performance.

EXAMPLE 2

A noble metal containing zeolite (beta) catalyst was streamed for 410 days in a hydroisomerization process application. The nominal operating conditions ranged from 500°-800° F. and 0.2-6.0 LHSV with a variety of gas oil feeds. During the course of operation, the catalyst was exposed to temperatures 100° F. above the normal operating temperature. Over this period fractional conversion exceeded 75 wt. %. As a result of this exposure, the catalyst experienced a deleterious change in performance in terms of product yields. The catalyst was regenerated using the presently disclosed procedure. The regenerated catalyst contained 7 wt. % carbon. The regeneration was successful in restoring catalyst performance to that of a fresh catalyst.

EXAMPLE 3

The same catalyst as above was aged for 4 months in a wax hydroisomerization process application. The process conditions lead to a shift in both temperature requirement and product yields. The catalyst was regenerated in 10 vol. % O2 at a temperature of 800° F. The regenerated catalyst contained an average of 10 wt. % coke. The catalyst was streamed and found to perform equivalently to a fresh catalyst.

EXAMPLE 4

A coked, platinum-containing, zeolite beta catalyst was obtained from a hydroisomerization process. A thermal gravimetric analysis (TGA) of this catalyst revealed the presence of 10 wt. % sorbed hydrocarbon, 2 wt. % soft coke and 13 wt. % hard coke, on a coke-free basis.

Sorbed hydrocarbons and soft coke were stripped from this catalyst by heating the catalyst in 1 vol. % O$_2$ to 700° F. for 5 hours in a tube furnace. Samples of this stripped catalyst were then subjected to conditions, including a temperature of 750° F., 20 vol. % O$_2$ and an H$_2$O level of 30 torr to remove hard coke. During the course of these regenerations, the coke loading, hydrocarbon sorption properties, and Pt dispersion of the catalyst were measured. The residual coke loading on the catalyst was determined by temperature-programmed oxidation. Dynamic hydrocarbon sorption measurements and X-ray diffraction were used to determine the cyclohexane sorption capacity and the extent of Pt agglomeration. Xe-NMR measurements were performed on select samples to give some qualitative insight on platinum/coke partitioning between the zeolite and binder. Finally, samples of regenerated catalysts were streamed in hydroisomerization service to determine the impact of regeneration variables on performance. These results are discussed below.

Effect of Regeneration Time on Coke Loading

The changes in coke loading as a function of regeneration time are summarized below in Table 2 based on both TGA and tube furnace regeneration. Note that coke loadings are expressed as a wt. % of the coke-free catalyst weight.

TABLE 2

| Time, hr. | Tube Furnace (wt. %) |
|---|---|
| 0 | 13 |
| 1 | 9.5 |
| 2 | 6.5 |
| 3 | 5.5 |
| 5 | 3.0 |
| 8 | 3.0 |

The tube furnace regenerations indicate that the catalyst contains ~3 wt. % coke that burns at very low rates at 750° F. Higher temperatures are required to remove this coke. A tube furnace experiment where the stripped catalyst was regenerated at 80° F. for 5 hours gave a catalyst with <1 wt. % coke. While the low coke loading may be desirable, other deleterious shifts occur in catalyst properties as discussed below.

Effect of Regeneration on Hydrocarbon Sorption Properties

Although the coke loading decreased monotonically with increasing regeneration time, the cyclohexane sorption capacity reached a maximum after 2 hours as shown in FIG. 1. The cyclohexane sorption capacity observed was 95 μl/g-cat for a decoked catalyst. Since the zeolitic pore volume cannot exceed that of the fully decoked catalyst, the increase in the pore volume suggests the formation of a second type of microporosity during regeneration. This unexpected observation is further confirmed by $^{129}$Xe-NMR spectroscopy. It is theorized that this second type of microporosity is formed during the combustion of coke, and it may be analogous to that of carbon molecular sieves formed by the controlled combustion of polymer (Lafyatis, D. S. et al., *Ind. Eng. Chem. Res.* 30 (5), p. 865–73 (1991)).

After 5 hours of regeneration at 750° F., the catalyst had 3 wt. % coke, and its cyclohexane sorption capacity and rate were equivalent to a decoked catalyst. Since this catalyst has zeolite sorption properties equivalent to the fully decoked catalyst, this residual coke must be associated with the binder. The non-monotonic variation in the cyclohexane sorption capacity as a function of regeneration time precludes its use as the exclusive quality control tool for commercial regeneration. Optimal coke removal requires knowledge of the relationship between cyclohexane sorption rate and coke loading. However, as a practical matter, a determination of the total hydrocarbon sorption capacity for a particular probe molecule, such as cyclohexane, is normally made in the course of determining the sorption rate for this probe molecule. Accordingly, the regeneration techniques described herein may involve a determination of the sorption capacity for a probe molecule in addition to the determination of the sorption rate for this probe molecule.

As mentioned above, the coke loading on the regenerated catalyst can be further reduced to <1 wt. % by regenerating the stripped catalyst at 850° F. for 5 hours. There is no observable improvement in the cyclohexane sorption capacity of the catalyst. However, the higher regeneration temperature resulted in further Pt agglomeration as indicated by the percentage of the total Pt that is XRD-visible, which increased from 42 to 67 wt. %.

Effect of Regeneration on Platinum Dispersion

Figure 2:
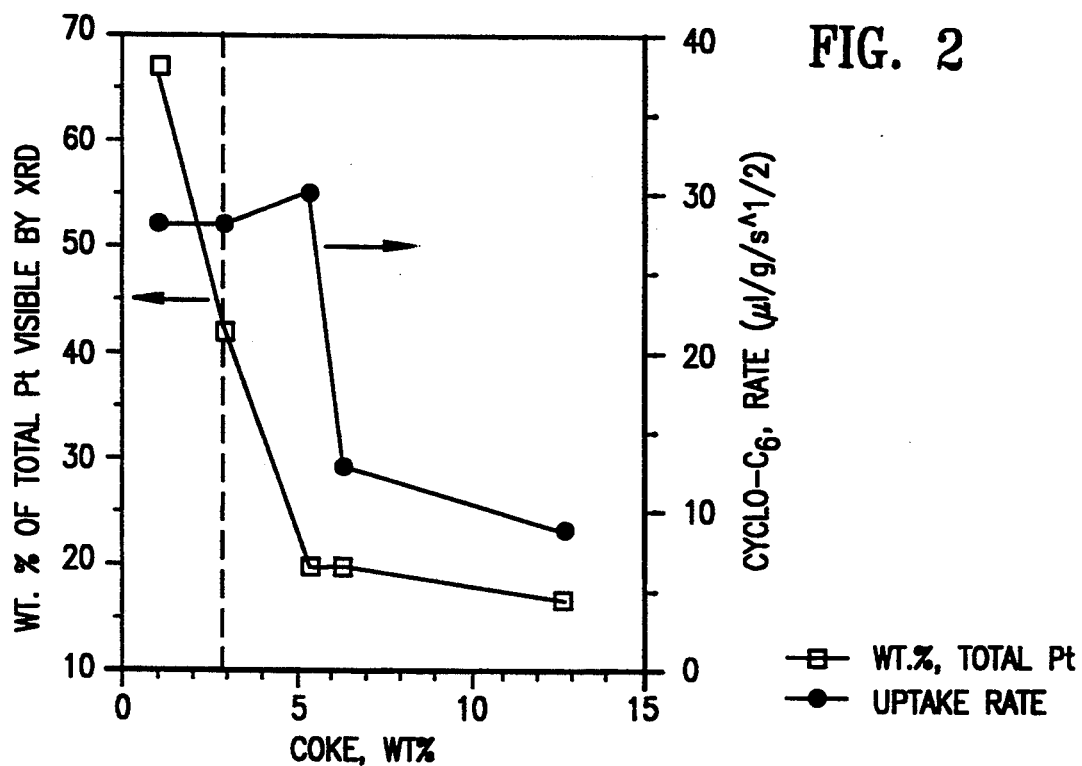
FIG. 2 is a graph showing platinum agglomeration and cyclohexane sorption rate as a function of coke loading for a catalyst subjected to regeneration conditions.

In order to define the optimum regeneration conditions, i.e., to maximize the recovery of the sorption properties of the zeolite, and to minimize the agglomeration of Pt, catalysts regenerated at 750° F. for 2, 3, and 5 hours were characterized for both their cyclohexane uptake rates and the amount of XRD-visible Pt. These results are summarized in FIG. 2. The results obtained from burning the stripped catalyst at 850° F. to yield <1 wt. % coke loading are also included.

After 2 hours at 750° F., there was no appreciable increase in cyclohexane uptake rate or in the amount of XRD-visible Pt. Over this period, the coke loading of the catalyst decreased from 13 to 6.5 wt. %. Extending the regeneration for an additional hour restored the cyclohexane uptake to the value of a decoked catalyst and reduced the coke loading to 5.5 wt. %. By regenerating the catalyst for 5 hours at 750° F. and reducing the coke loading to 3 wt. %, there was no significant difference in the cyclohexane uptake rate, but the percentage of the total Pt that is XRD-visible increased from 20 to 42 wt. %. By increasing the severity of the regeneration conditions (850° F., 5 hours) and reducing the coke loading to <1 wt. %, the percentage of the total Pt that is XRD-visible increased to 67 wt. % with no further improvement in cyclohexane sorption uptake rate.

These results suggest that the onset of Pt migration is determined by the extent of coke removal in the zeolite. Once the channels of the zeolite are "clear" significant Pt agglomeration will occur. Therefore, the cyclohexane uptake rate measurement can be used to determine the optimal catalyst regeneration conditions.

Evaluations on Regenerated Catalysts

Figure 3:
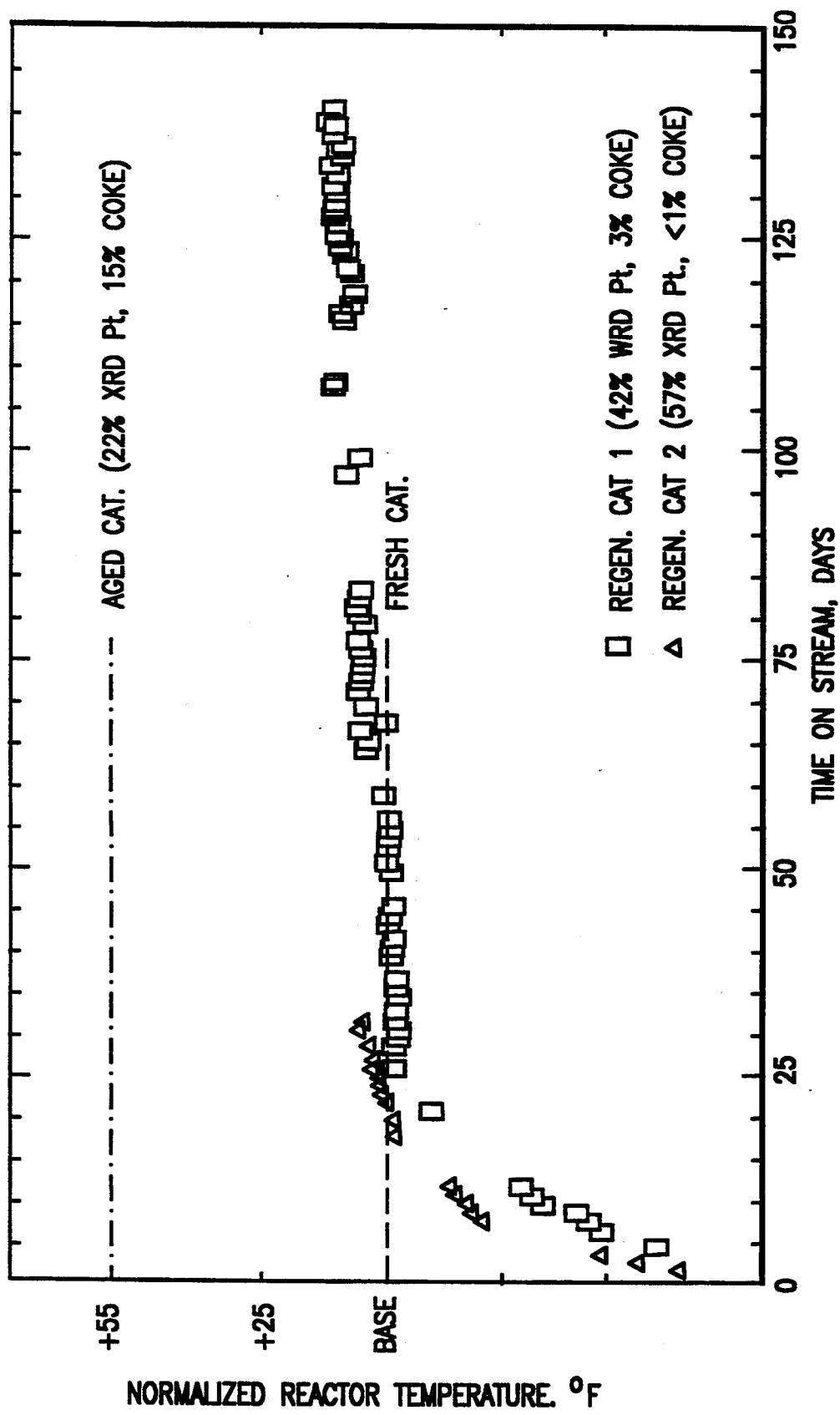
FIG. 3 is a graph showing normalized reactor temperatures as a function of time on stream for pilot unit evaluations of catalysts used for isomerization dewaxing.

The temperature requirement for the catalysts containing 42 wt. % and 57 wt. % of the total Pt in the form of XRD-visible platinum is compared to fresh and aged catalysts in FIG. 3. The initial activity of the regenerated catalyst with 42 wt. % XRD-visible platinum and 3 wt. % residual coke is equivalent to that of a fresh catalyst. However, after ~75 days on stream (DOS), the regenerated catalyst begins to age at ~3°–4° F./month. The temperature requirement for the regenerated catalyst requires 55° F. higher temperature although it has a lower level of XRD-visible platinum.

The distillate, naphtha, and light gas selectivities among the fresh, aged, and regenerated catalyst, calculated at a level of conversion equal to 35 wt. % conversion of the 650+° F. feed, are shown in Table 3. The aged catalyst lost about 8.8 wt. % distillate yield after 374 DOS and accumulated 15 wt. % of total (i.e., soft+hard) coke. The first regenerated catalyst (42 wt. % XRD Pt, 3 wt. % coke) has distillate yield that is within 4.3 wt. % of a fresh catalyst after the removal of the majority of the coke, despite further agglomeration of Pt. This implies that the coke effects the distillate selectivity for the aged catalyst. However, the distillate yield for the second regenerated catalyst with 57 wt. % XRD-visible Pt was worse than that of the aged catalyst despite the complete removal of the coke. This is due to the loss of metal/acid balance resulting from the loss in intrazeolite platinum as confirmed by Xe-NMR results.

TABLE 3

|  | Pt Agglomeration* | Lt. Gas, wt. %. | Naphtha, wt. % | Distillate, wt. % |
|---|---|---|---|---|
| Fresh Catalyst | 0 | Base | Base | Base |
| Aged Catalyst, 15 wt. % coke | 22 | +2.4 | +5 | −8.8 |
| Regen. Catalyst, 3 wt. % coke | 42 | +1.0 | +2.7 | −4.3 |
| Regen. Catalyst, <1 wt. % coke | 57 | +2.9 | +5 | −9.3 |

*Wt. % of total Pt visible by XRD

What is claimed is:

1. A process for regenerating a catalyst which has been deactivated during a hydrocarbon processing step by coke deposition thereon, said catalyst comprising a zeolite and a noble metal, said process also providing a means for selecting oxidation conditions for subsequent regenerations, said process comprising the steps of:
   (a) contacting said catalyst with an oxygen containing gas under sufficient oxidation conditions to progressively remove said coke from said catalyst in a controlled manner;
   (b) removing samples of said catalyst during the course of the progressive removal of coke achieved in accordance with step (a);
   (c) measuring at least one of the following properties for each sample removed in accordance with step (b): (1) the sorption rate of a probe molecule into said sample; or (2) the amount of noble metal agglomeration in the sample;
   (d) determining at least one of the following aspects of the process: (1) the point during course of progressive removal of coke in step (a) when the maximum sorption rate of said probe molecule is reached for samples measured as per step (c); or (2) the point during course of progressive removal of coke in step (a) when the rate of noble metal agglomeration increases significantly for samples measured in step (c);
   (e) discontinuing the oxidation conditions of step (a); and
   (f) recovering said catalyst having coke removed therefrom.

2. A process according to claim 1, wherein said zeolite has a silica/alumina molar ratio of at least 30, and wherein said catalyst has been deactivated by coke deposition thereon during a hydrocarbon processing step selected from the group consisting of hydrocracking, naphtha reforming and dewaxing.

3. A process according to claim 2, wherein said zeolite is selected from the group consisting of zeolite beta, zeolite Y, ZSM-3, ZSM-4, ZSM-5, ZSM-11, ZSM-12, ZSM-18, ZSM-20, ZSM-22, ZSM-23, ZSM-35, ZSM-38, ZSM-48, MCM-22, and MCM-49.

4. A process according to claim 3, wherein said zeolite is zeolite beta.

5. A process according to claim 4, wherein said noble metal is Pt.

6. A process according to claim 5, wherein the cyclohexane sorption rate is measured in accordance with step (c).

7. A process according to claim 6, wherein the amount of noble metal agglomerization is measured by the weight percentage of platinum having a particle size of 50 Angstroms or greater as determined X-ray diffraction analysis.

8. A process for regenerating a catalyst which has been deactivated during a hydroisomerization step by coke deposition thereon, said catalyst comprising a zeolite and a noble metal, said process comprising the steps of:
   (i) contacting said catalyst with an oxygen containing gas under sufficient oxidation conditions to progressively and only partially remove said coke from said catalyst;
   (ii) discontinuing said oxidation conditions of step (i) at a point when the catalyst contains at least 1 weight percent of coke, as measured by elemental analysis of carbon, based upon the weight of the fresh catalyst; and
   (iii) recovering said catalyst containing at least 1 percent by weight of coke,
wherein said oxidation conditions employed in step (i) and said point which these conditions are discontinued as per step (ii) are determined by monitoring a test regeneration of a batch of said catalyst, said monitoring comprising the steps of:
   (a) contacting a batch of said catalyst with an oxygen containing gas under sufficient oxidation conditions to progessively remove said coke from said catalyst;
   (b) removing samples of said catalyst during the course of the progressive removal of coke achieved in accordance with step (a);
   (c) measuring at least one of the following properties for each sample removed in accordance with step (b): (1) the sorption rate of a probe molecule into said sample; or (2) the amount of noble metal agglomeration in the sample;
   (d) determining at least one of the following aspects of the test process: (1) the point during course of progressive removal of coke in step (a) when the maximum sorption rate of said probe molecule is reached for samples measured as per step (c); or (2) the point during course of progressive removal of coke in step (a) when the rate of noble metal agglomeration increases significantly for samples measured in step (c); and
   (e) using the determinations of step (d) to set the conditions of step (i) and the point at which these conditions are discontinued as per step (ii).

9. A process according to claim 8, wherein said zeolite has a silica/alumina molar ratio of at least 30.

10. A process according to claim 9, wherein said zeolite is selected from the group consisting of zeolite beta, zeolite Y, ZSM-3, ZSM-4, ZSM-5, ZSM-11, ZSM-12, ZSM-18, ZSM-20, ZSM-22, ZSM-23, ZSM-35, ZSM-38, ZSM-48, MCM-22, and MCM-49.

11. A process according to claim 10, wherein said zeolite is zeolite beta.

12. A process according to claim 11, wherein said noble metal is Pt.

13. A process according to claim 12, wherein said coke is deposited on said catalyst during the hydroisomerization of wax in a wax containing feedstock.

14. A process according to claim 8, wherein the deactivated catalyst, prior to step (i), contains at least 5 wt. % of coke, as measured by elemental analysis of carbon, based upon the weight of the fresh catalyst.

15. A process according to claim 14, wherein said weight percent of coke of the recovered catalyst of step (ii) is from 1 to 15.

16. A process according to claim 15, wherein said weight percent of coke of the deactivated catalyst is at least 15.

17. A process according to claim 16, wherein said weight percent of coke of the recovered catalyst of step (iii) is from 3 to 8.

18. A process according to claim 8, wherein said oxygen containing gas comprises nitrogen.

19. A process according to claim 18, wherein said oxygen containing gas further comprises at least one combustion product selected from the group consisting of $H_2O$, $CO$, $CO_2$, $SO_2$, $S_3$, $NO$, and $NO_2$.

20. A process according to claim 8, wherein said oxidation conditions include a temperature of from about 177° C. to about 649° C.

21. A process according to claim 8, wherein said oxidation conditions include a temperature of less than 427° C.

22. A process according to claim 8, wherein said oxygen containing gas comprises 1–21 vol. % $O_2$.

23. A process for regenerating a catalyst which has been deactivated during a hydroisomerization step by coke deposition thereon, said catalyst comprising a zeolite and a noble metal, said process comprising the steps of:
   (i) contacting said catalyst with an oxygen containing gas under sufficient oxidation conditions to progressively and only partially remove said coke from said catalyst;
   (ii) removing at least one sample of catalyst during the course of step (i) and, for each sample removed, measuring either (1) the rate of sorption of a probe molecule or (2) the noble metal agglomeration;
   (iii) using the measurement(s) taken in step (ii) to determine whether to modify or discontinue the oxidation conditions of step (i);
   (iv) discontinuing said oxidation conditions of step (i) at a point when the catalyst contains at least 1 wt. % of coke, as measured by elemental analysis of carbon, based upon the weight of the fresh catalyst; and
   (v) recovering said catalyst containing at least 1 percent by weight of coke.

24. A process according to claim 23, wherein said zeolite is zeolite beta.

25. A process according to claim 24, wherein said noble metal is Pt.

* * * * *

UNITED STATES PATENT AND TRADEMARK OFFICE
CERTIFICATE OF CORRECTION

PATENT NO. : 5,393,717
DATED : February 28, 1995
INVENTOR(S) : M.R. Apelian et al.

It is certified that error appears in the above-indentified patent and that said Letters Patent is hereby corrected as shown below:

Col. 13, claim 19, line 19, "$S_3$" should be --$SO_3$--.

Signed and Sealed this

Second Day of May, 1995

BRUCE LEHMAN

Attest:

Attesting Officer

Commissioner of Patents and Trademarks